US008756969B2

(12) United States Patent
Gosmann et al.

(10) Patent No.: US 8,756,969 B2
(45) Date of Patent: Jun. 24, 2014

(54) METHOD OF MAKING A HARDENED SHEET METAL PART

(75) Inventors: Stefan Gosmann, Bad Wünnenberg (DE); Josef Köster, Höxter (DE); Oliver Lütkemeier, Paderborn (DE)

(73) Assignee: Benteler Automobiltechnik GmbH, Paderborn (DE)

( * ) Notice: Subject to any disclaimer, the term of this patent is extended or adjusted under 35 U.S.C. 154(b) by 641 days.

(21) Appl. No.: 12/255,199

(22) Filed: Oct. 21, 2008

(65) Prior Publication Data

US 2009/0101249 A1 Apr. 23, 2009

(30) Foreign Application Priority Data

Oct. 23, 2007 (DE) .................. 10 2007 050 907

(51) Int. Cl.
*B21D 31/02* (2006.01)
*C21D 8/00* (2006.01)

(52) U.S. Cl.
USPC .......................................... 72/331; 148/648

(58) Field of Classification Search
USPC ..................... 148/648, 654; 72/331
See application file for complete search history.

(56) References Cited

U.S. PATENT DOCUMENTS

| | | | |
|---|---|---|---|
| 6,878,220 B2 | 4/2005 | Gehringhoff et al. | |
| 6,949,151 B2 | 9/2005 | Müller et al. | |
| 7,938,949 B2 | 5/2011 | Brandstätter et al. | |
| 2002/0053551 A1 | 5/2002 | Koester et al. | |
| 2003/0025353 A1 | 2/2003 | Gosmann | |
| 2003/0046814 A1 | 3/2003 | Knaup et al. | |
| 2003/0066581 A1 | 4/2003 | Gehringhoff et al. | |
| 2003/0066582 A1* | 4/2003 | Gehringhoff et al. | 148/648 |
| 2003/0163920 A1 | 9/2003 | Gehringhoff et al. | |
| 2004/0255446 A1 | 12/2004 | Knaup | |
| 2006/0137779 A1 | 6/2006 | Brodt et al. | |
| 2007/0107203 A1* | 5/2007 | Kroger et al. | 29/557 |
| 2007/0136287 A1 | 6/2007 | Koester et al. | |
| 2009/0211669 A1 | 8/2009 | Vehof | |
| 2010/0126640 A1 | 5/2010 | Fang | |

FOREIGN PATENT DOCUMENTS

| | | |
|---|---|---|
| DE | 24 52 486 | 5/1975 |
| DE | 37 09 181 | 9/1988 |
| DE | 39 25 733 | 2/1990 |
| DE | 197 23 655 B4 | 12/1997 |
| DE | 196 40 568 | 4/1998 |
| DE | 101 49 220 | 8/2002 |
| DE | 101 49 221 | 8/2002 |
| DE | 101 20 919 A1 | 10/2002 |
| DE | 102004019693 | 11/2005 |
| DE | 102004038626 | 2/2006 |
| DE | 10 2005 051 403 | 3/2007 |
| DE | 102006040224 | 3/2008 |

(Continued)

*Primary Examiner* — Roy King
*Assistant Examiner* — Caitlin Kiechle
(74) *Attorney, Agent, or Firm* — Henry M. Feiereisen LLC

(57) ABSTRACT

In a method of making a hardened sheet metal part, a blank is cut to form a region defined by at least one cutting edge having a cutting depth which is smaller than a material thickness of the blank. The blank is subjected to a hot forming step and at least in one area is allowed to harden. After the hot forming step, the region is pushed along the cutting edge.

10 Claims, 1 Drawing Sheet

(56) References Cited

FOREIGN PATENT DOCUMENTS

| | | |
|---|---|---|
| DE | 102007002678 | 7/2008 |
| EP | 1 253 208 | 10/2002 |
| EP | 1 266 972 | 12/2002 |
| WO | WO 99/07492 | 2/1999 |
| WO | WO 2005/021821 | 3/2005 |

* cited by examiner

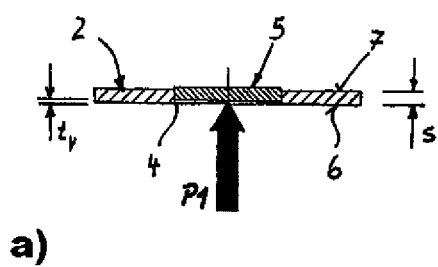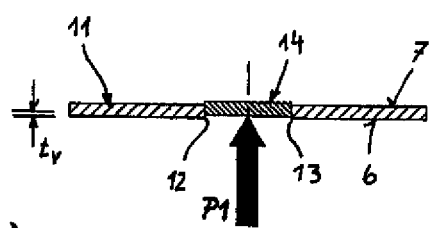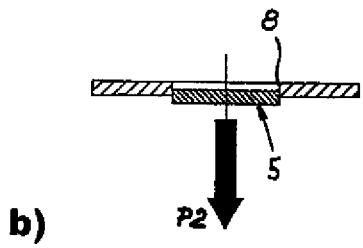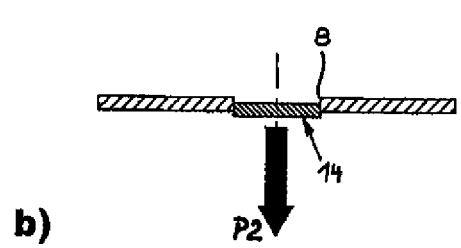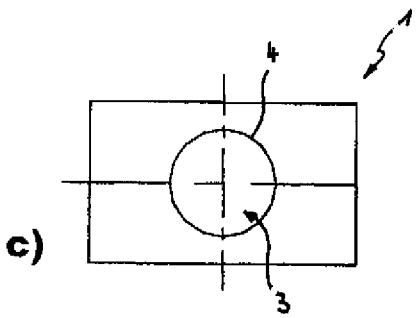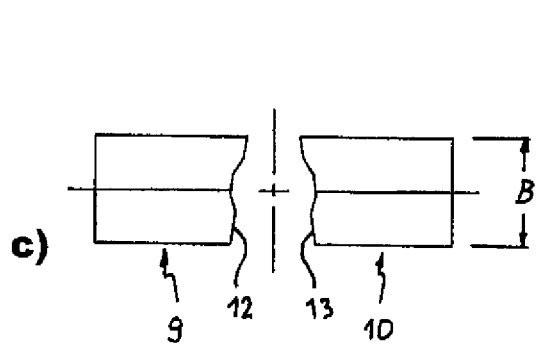
Fig. 1
Fig. 2

METHOD OF MAKING A HARDENED SHEET METAL PART

CROSS-REFERENCES TO RELATED APPLICATIONS

This application claims the priority of German Patent Application, Serial No. 10 2007 050 907.5, filed Oct. 23, 2007, pursuant to 35 U.S.C. 119(a)-(d), the content of which is incorporated herein by reference in its entirety as if fully set forth herein.

BACKGROUND OF THE INVENTION

The present invention relates to a method of making a hardened sheet metal part from a blank.

Nothing in the following discussion of the state of the art is to be construed as an admission of prior art.

International Publication NO. WO 99/07492 describes a method of making a hardened sheet steel product. A sheet steel blank is hereby hot stamped and rapidly cooled in a pair of cooled tools in a process called press hardening. The blank has holes that are collared by mandrels in connection with the forming. The collaring is carried out in unhardened material, but the collars harden directly when formed. The holes can be used for fasteners or they can be used as reference holes or receptacles for orientation of the sheet metal product. The need to pre-manufacture the holes in the blank is disadvantageous because the dimensional accuracy of the produced sheet metal product depends on the initial perforation. Circular holes may thus easily assume an oval shape during forming. When deviating from predefined tolerances, the produced sheet metal product becomes therefore useless. In particular when sheet metal products are involved that have complex geometries, the rate of rejects or waste increases substantially.

Although the execution of hot forming and hardening steps in a single press tool is efficient, any following cutting operation of the hardened sheet metal part is complex and cost-intensive, accompanied by substantial tool wear.

It would be desirable and advantageous to provide an improved method of making hardened sheet metal parts to obviate prior art shortcomings and to enable precise cutting operations on the sheet metal part.

SUMMARY OF THE INVENTION

According to one aspect of the present invention, a method of making a hardened sheet metal part includes the steps of cutting a blank to form a region defined by at least one cutting edge having a cutting depth which is smaller than a material thickness of the blank, hot forming the blank and allowing at least one area of the blank to harden, and pushing out the region along the cutting edge after the hot forming step.

As a result of the method according to the invention, the blank can be provided with holes or openings at high precision. Even separation of the structural part is easy to implement, in particular when manufacturing two parts simultaneously in the press tool from a blank. After hot forming, the sheet metal parts are separated. The cut region is hereby pushed out along the cutting edges. The dimensional and positional accuracy of the executed cutting operations is greatly enhanced, and wear of the cutting tools is reduced as there is no longer any need to separate the entire wall thickness during the pushing out process which is carried out after the hot forming step.

According to another feature of the present invention, the cutting step includes the step of displacing material of the blank in the region out of a plane in one direction. In this way, the cut region is thus expelled of the plane or area on the blank side opposite to the cutting edge.

According to another feature of the present invention, the cutting step may be executed before the hot forming step. In other words, the cutting step is implemented, using the initial blank that has been cut to size. As an alternative, the cutting step may also be executed during the hot forming step, i.e. in the press tool.

According to another feature of the present invention, the cutting depth may be half the material thickness of the blank. Currently preferred is a cutting depth which is a third of the material thickness of the blank. The cutting depth should be selected in such a way that the cutting tool can easily be withdrawn from the material after performing the cutting operation.

According to another feature of the present invention, the cutting and pushing out steps can be executed in opposite directions. The blank is hereby cut from one side to form the cut region, and the material in the cut region is displaced to the other side of the blank. To expel the cut region, it is pressed from the other side of the blank. This causes initially an edge indentation so that both sides of the blank exhibit cutting areas that a free of burrs.

According to another feature of the present invention, the pushing out step can be executed in a press tool in a follow-on step. This procedure is especially efficient. The pushing out step may, basically, also be realized outside the press tool in a subsequent processing tool.

According to another feature of the present invention, the hot forming step of the blank may be executed at a temperature range between 850° C. and 950° C. Currently preferred is a temperature range between 910° C. and 940° C.

According to another feature of the present invention, the blank may be made from a steel alloy having a carbon content between 0.15% by weight and 0.3% by weight. This type of material is easy to shape and can be quenched and tempered in its entirety or also only in some areas thereof. Furthermore, the blank possesses the necessary material properties with respect to required strength and deformation behaviors.

A method according to the present invention is especially suitable for the production of hardened sheet metal parts for application in the chassis or as structural parts of motor vehicles.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 1 is a simplified schematic representation of a first embodiment of process steps for making a hardened sheet metal part in accordance with the present invention; and FIG. 2 is a simplified schematic representation of a second embodiment of process steps for making a hardened sheet metal part in accordance with the present invention.

DETAILED DESCRIPTION OF PREFERRED EMBODIMENTS

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a simplified schematic representation of a first embodiment of process steps a), b) and c) for making a hardened sheet metal part 1 (FIG. 1*c*) from a blank 2 (FIGS. 1*a*, 1*b*). The blank 2 is hereby hot formed in a press tool and subsequently hardened in its entirety or at least in some areas thereof. While the sheet metal part 1 is in the hot forming tool, it is provided with a hole or opening 3 at slight tolerance.

The blank 2 undergoing hot forming and press hardening in the press tool is made from a steel material having a carbon content between 0.15% by weight and 0.3% by weight. The blank 2 is heated to a hardening temperature, i.e. to a temperature above $Ac_3$, in particular to a temperature of 850° C. to 950° C. Currently preferred is a temperature range of 910° C. to 940° C. The blank 2 is then shaped in the press tool into the sheet metal part 1. While still being clamped in the press tool, the sheet metal part 1 is hardened through rapid quenching.

The opening 3 is realized by cutting the blank 2 before the hot forming step to provide a region 5 which is bounded by a cutting edge 4 (FIG. 1*a*). The cutting edge 4 is hereby closed and has a cutting depth $t_V$ which is smaller than a material thickness s of the blank 2, e.g. by one half. Currently preferred is a cutting depth $t_V$ which is smaller by about one third of a material thickness s of the blank 2. The blank 2 is then hot formed, and, after the hot forming operation, the cut region 5 is pushed out or expelled along the cutting edge 4 in the form of a flash piece (FIG. 1*b*). Of course, the cutting operation to establish the region 5 may also be executed during the course of the hot forming operation.

Cutting involves a cutting of the blank 2 from the flat side 6, while the material in the region 5 is displaced out of the plane of the blank 2 in the direction of the other flat side 7 (arrow P1). The region 5 is subsequently pushed out after the hot forming operation in a direction in opposition to the cutting operation. As a result, an edge indentation 8 is generated on the flat side 7 of the blank 2 and the region 5 is severed along the cutting edge 4 and expelled (arrow P2). Cutting and expulsion of the region 5 are thus implemented in opposite directions. Especially efficient is an expulsion of the region 5 in the press tool during a subsequent processing step. The predefined cutting edge 4 enables hereby the realization of burr-free cut contours, when the region 5 is pushed out in the hot forming tool.

Referring now to FIG. 2, there is shown a simplified schematic representation of a first embodiment of process steps a), b) and c) for realizing a burr-free separation of two sheet metal parts 9, 10 during production in a hot forming tool. A blank 11 is used as starting product and cut before the hot forming operation to establish cutting edges 12, 13 (FIG. 2*a*). The cutting edges 12, 13 extend across the entire width B of the blank 11 and bound a region 14. The cutting depth $t_V$ of the region 14 may be about one third of the material strength s of the blank 11.

The blank 11 is then hot formed in a press tool and hardened. The sheet metal parts 9, 10 receive hereby their profile. After hot forming and hardening, the sheet metal parts 9, 10 are still connected to one another by the region 14. In order to separate the sheet metal parts 9, 10, the region 14 is pushed out along the cutting edges 12, 13, to separate the sheet metal parts 9, 10 from one another. As a result, a burr-free separation of the sheet metal parts 9, 10 is accomplished.

Cutting and expulsion of the region 14 is attained in a same manner as described above with reference to FIG. 1 so that same reference numerals are used in FIG. 2 for parts corresponding to those in FIG. 1.

Of course, the production of differently cut profiles or contours can be realized by cutting before or during hot forming operation and a separation and expulsion after hot forming.

As the sheet metal parts 9, 10 are connected to one another until the region 14 is pushed out, they can be transported in the form of a chain to subsequent processing operations and later separated from one another outside of the hot forming tool.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein.

What is claimed is:

1. A method of making a hardened sheet metal part, comprising the steps of:
   cutting a blank to form a region defined by at least one cutting edge having a cutting depth which is smaller than a material thickness of the blank, while displacing the region out of a plane of the blank in one direction such that a surface of the region protrudes over a surface of the blank;
   hot forming the blank and allowing at least one area of the blank to harden; and
   pushing out the region along the cutting edge after the hot forming step.

2. The method of claim 1, wherein the cutting step is executed before the hot forming step.

3. The method of claim 1, wherein the cutting step is executed during the hot forming step.

4. The method of claim 1, wherein the cutting depth is smaller than half the material thickness of the blank.

5. The method of claim 1, wherein the cutting depth is a third of the material thickness of the blank.

6. The method of claim 1, wherein the cutting and pushing out steps are executed in opposite directions.

7. The method of claim 1, wherein the pushing out step is executed in a press tool.

8. The method of claim 1, further comprising the step of heating the blank before the hot forming step to a temperature of 850° C. to 950° C.

9. The method of claim 1, further comprising the step of heating the blank before the hot forming step to a temperature of 910° C. to 940° C.

10. The method of claim 1, wherein the blank is made of a steel alloy having a carbon content between 0.15% by weight and 0.3% by weight.

* * * * *